(12) United States Patent
Arning et al.

(10) Patent No.: US 8,517,431 B2
(45) Date of Patent: Aug. 27, 2013

(54) FITTING FOR THICK-WALLED PIPES AND METHOD FOR ITS PRODUCTION

(75) Inventors: Ulrich Arning, Attendorn (DE); Bernd Koschig, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 0 days.

(21) Appl. No.: 13/147,714

(22) PCT Filed: Jan. 19, 2010

(86) PCT No.: PCT/EP2010/050588
§ 371 (c)(1),
(2), (4) Date: Sep. 20, 2011

(87) PCT Pub. No.: WO2010/089188
PCT Pub. Date: Aug. 12, 2010

(65) Prior Publication Data
US 2012/0001414 A1    Jan. 5, 2012

(30) Foreign Application Priority Data
Feb. 3, 2009   (DE) .................... 10 2009 007 303

(51) Int. Cl.
*F16L 13/14* (2006.01)
(52) U.S. Cl.
USPC ........................................ 285/382; 285/256
(58) Field of Classification Search
USPC ................... 285/382, 382.4, 382.5, 340, 256, 285/257
See application file for complete search history.

(56) References Cited

U.S. PATENT DOCUMENTS

| | | | | |
|---|---|---|---|---|
| 2,120,067 A * | 6/1938 | Gray et al. | ................. | 285/382.5 |
| 3,501,178 A | 3/1970 | Watts | | |
| 3,915,480 A * | 10/1975 | Kish et al. | ..................... | 285/382 |
| 4,372,586 A * | 2/1983 | Rosenberg et al. | ........... | 285/382 |
| 4,621,842 A * | 11/1986 | Kowal et al. | .................. | 285/382 |
| 4,880,260 A * | 11/1989 | Gotoh et al. | ............... | 285/382.2 |
| 6,049,962 A * | 4/2000 | Pfeiffer | ...................... | 285/382.2 |
| 6,224,114 B1 * | 5/2001 | Franzen et al. | ............... | 285/340 |
| 6,581,983 B1 * | 6/2003 | Viegener | ....................... | 285/382 |
| 6,805,385 B2 * | 10/2004 | Viegener | ....................... | 285/340 |
| 7,316,429 B2 * | 1/2008 | Viegener | ....................... | 285/340 |
| 7,770,429 B2 * | 8/2010 | Viegner et al. | ............. | 72/370.06 |
| 7,942,456 B2 * | 5/2011 | Duggan et al. | ................ | 285/382 |
| 7,954,861 B2 * | 6/2011 | Swift et al. | .................... | 285/382 |
| 8,118,331 B2 * | 2/2012 | Yamashita et al. | ............ | 285/382 |
| 2002/0007547 A1 | 1/2002 | Unewisse et al. | | |
| 2004/0003645 A1 * | 1/2004 | Viegener et al. | .......... | 72/370.06 |
| 2010/0229368 A1 | 9/2010 | Frenken et al. | | |

FOREIGN PATENT DOCUMENTS

| | | |
|---|---|---|
| CN | 1217771 A | 5/1999 |
| DE | 2511090 A1 | 6/1976 |

(Continued)

*Primary Examiner* — David E Bochna
(74) *Attorney, Agent, or Firm* — The Webb Law Firm

(57) ABSTRACT

A fitting for thick-walled pipes, having a contact region and a pressing region, the pressing region being arranged on the side of the contact region facing towards the pipe insertion opening, and the wall thickness in the pressing region being at least in sections less than the wall thickness in the contact region. The invention also relates to a method for producing a fitting for thick-walled pipes, in which a thick-walled pipe is radially widened in a fitting region arranged at one pipe end so that the internal diameter of the fitting region corresponds substantially to the external diameter of the pipe and the wall thickness in the fitting region corresponds substantially to the wall thickness of the rest of the pipe.

9 Claims, 5 Drawing Sheets

(56) References Cited

FOREIGN PATENT DOCUMENTS

| DE | 19507688 | A1 | 9/1996 |
| DE | 19840668 | C1 | 11/1999 |
| DE | 10007914 | C1 | 9/2001 |
| DE | 20219600 | U1 | 6/2004 |
| DE | 102004045981 | A1 | 7/2005 |
| DE | 102006050427 | A1 | 2/2008 |
| EP | 0955493 | A1 | 11/1999 |
| EP | 1201982 | A2 | 5/2002 |
| EP | 1431643 | A1 | 6/2004 |
| EP | 1593899 | A1 | 11/2005 |
| GB | 2234306 | A | 1/1991 |

* cited by examiner

FITTING FOR THICK-WALLED PIPES AND METHOD FOR ITS PRODUCTION

BACKGROUND OF THE INVENTION

1. Field of the Invention

The invention relates to a fitting for thick-walled pipes, having a contact region and a pressing region, the pressing region being arranged on the side of the contact region facing towards the pipe insertion opening. The invention also relates to a system consisting of a pipe and a fitting, and to the use of the fitting to connect thick-walled pipes. The invention furthermore relates to a method for producing a fitting for thick-walled pipes, in which a thick-walled pipe is radially widened in a fitting region arranged at one pipe end so that the internal diameter of the fitting region corresponds substantially to the external diameter of the pipe and the wall thickness in the fitting region corresponds substantially to the wall thickness of the rest of the pipe, and in which a subregion of the fitting region, arranged at the pipe end, is radially stretched so that the internal diameter of the subregion is greater than the external diameter of the pipe.

2. Description of Related Art

In order to transport fluid media, for example water, over large distances, pipes or pipe systems made of inexpensive alloys are often used in the prior art to save cost. These alloys are often not corrosion-resistant, so that the pipes gradually corrode superficially on their inside owing to the mediums conveyed in them. Typical material erosion for such surface corrosion lies in the range of from 100 to 150 μm per year.

In order to ensure a sufficient lifetime of the pipes despite the corrosion, thick-walled pipes are predominantly used so that the pipe remains leaktight for typical periods of from 10 to 30 years despite the annual material erosion. Thus, according to DIN EN 10255, medium-weight pipes with a nominal thickness of ½ have a wall thickness of 2.6 mm and pipes with a nominal width of 4" have a wall thickness of 4.5 mm. In terms of the surface corrosion, it is particularly important for the pipe walls in contact with the medium to have a uniform thickness, since locally thinner-walled points would otherwise lead to premature rusting through and therefore to leakage. The lifetime of such pipe systems is thus dependent on the wall thickness of the thinnest-walled point in contact with the medium.

The fittings used to connect the pipes represent a particular weak point. They usually likewise consist of a material which is not corrosion-resistant and therefore, if rusting through is intended to be prevented, they must also have large wall thicknesses like the pipes.

For the production of a leaktight connection between a fitting and a pipe, in the case of thin-walled pipes with nominal widths of between 15 and 108 mm it is conventional to compress the fitting with the thin-walled pipe. It has been found that long-term leaktightness of the connection is ensured in this way. Such a connection is disadvantageous for thick-walled pipes since, owing to the large wall thickness of the fittings used to connect thick-walled pipes in the prior art, such compression is very difficult because of the high rigidity of the thick-walled fittings and is possible only with very high force application using particularly elaborate and expensive pressing tools. For this reason, in the prior art such a fitting is conventionally not connected to a thick-walled pipe by compression, but in a different way. In particular, threaded connectors according to DIN EN 10242 based on screws and clamps are used. The installation of such connections is time consuming and is accompanied by a laborious preparation of the pipe ends to be connected. Such connections furthermore have the disadvantage that they do not achieve the durability of compressed connections and/or they require more elaborate and therefore more expensive fittings.

SUMMARY OF THE INVENTION

It is therefore an object of the invention to provide a fitting for thick-walled pipes which avoids the disadvantages mentioned above.

This object is achieved according to the invention in that the wall thickness in the pressing region is at least in sections less than the wall thickness in the contact region. The contact region is in this case intended to mean the region of the fitting which is in contact with the medium being conveyed.

It has been discovered that compression with such a fitting requires less force owing to the smaller wall thickness in the pressing region, and for this reason, for example, the use of particularly elaborate and expensive pressing tools can be obviated. At the same time, the greater wall thickness in the contact region ensures that the fitting does not prematurely rust through in this region.

Since a thick-walled fitting is used in particular to delay rusting through, the wall in a preferred embodiment consists substantially of a steel, in particular a non-stainless steel.

In another preferred embodiment, a sealing element, preferably an annular sealing element, is provided in the transition region between the pressing region and the contact region. This sealing element seals the fitting between the contact region and the pressing region. The effect achieved by this is that the medium being conveyed in the fitting cannot reach the pressing region of the fitting. In this way, moreover, corrosion by the medium does not take place in this region, so that premature rusting through of the thinner wall in the pressing region is avoided. An annular sealing element is particularly preferred in this case, since in this way the medium can be prevented over the entire circumference of the fitting from reaching the pressing region of the fitting. Particularly reliable sealing can be achieved with a resilient sealing element, for example made of rubber or plastic.

A particularly stable connection is achieved in another embodiment of the fitting in that a cutting element is provided in the pressing region. During compression of the fitting with the pipe, the cutting element engages into the outer wall of the pipe so that the pipe remains firmly connected to the fitting even in the event of sudden tensile or compressive loads, and the connection therefore remains leaktight. This embodiment is particularly advantageous in combination with the sealing element from the previous embodiment. Since cutting elements often have substantially smaller thicknesses than the walls of the fitting or the pipe, surface corrosion by the medium can particularly rapidly lead to rusting through of the cutting element. This is prevented by the sealing element because the medium cannot even reach the pressing region and therefore the region of the cutting element.

In another embodiment, the cutting element comprises an annular base body and cutting members arranged on the base body along its circumference, each cutting member having at least one inwardly pointing blade and each cutting member being mirror-symmetrical with respect to a radial plane of the annular base body. A radial plane is in this case intended to mean a plane which extends perpendicularly to the axial symmetry direction of the annular base body. Symmetrical cutting rings have the advantage that the forces acting on the cutting element are distributed more uniformly. Local overloading of the cutting ring can be prevented in this way. During manufacture of the annular cutting elements for fittings, twisting of the cutting ring often takes place owing to asymmetric force application on the annular base body during production of the inwardly pointing blades. This is prevented by this embodiment in that, owing to the mirror symmetry, it is possible to produce the cutting members with symmetrical force application. Furthermore, the cutting edge is arranged centrally in the pressing region so that unintended tilting of the cutting edges, or rotation of the cutting ring, is prevented. Such a cutting ring can also be mounted more simply in the fitting.

The cutting element described above represents an invention independent of the fitting described previously.

Particularly symmetrical force application during the production of the cutting element, and therefore a particularly undistorted cutting element, are achieved in another preferred embodiment in that all the cutting members are mirror-symmetrical with respect to a single radial plane of the annular base body.

In another preferred embodiment, the cutting members each comprise two blades spaced apart in the axial direction. The axial direction is in this case intended to mean the axial symmetry direction of the annular base body. The advantage of this embodiment is that the mirror symmetry of a cutting member can be achieved particularly simply in this way. Furthermore, two blades provide a stronger connection between the cutting ring and the pipe than a single blade does.

The pipe is secured against relative movements with respect to the fitting in both axial directions in another embodiment in that the respective two blades of a cutting member are directed obliquely towards one another or obliquely away from one another. In this way, the two blades cut obliquely into the outer wall of the pipe, so that when a force is applied axially one of the two blades is engaged further into the outer wall and stability of the connection is thus ensured.

In another preferred embodiment, the pressing region has at least one stop for the cutting ring on the side facing away from the contact region. Owing to the stop, the cutting ring is held in its position in the uncompressed state of the fitting and cannot fall out of the fitting. Furthermore, the cutting element is additionally fixed in its position in the compressed state of the fitting as well, so that the cutting element remains reliably in its place even during axial force application on the connection of the pipe and the fitting.

The production of the fitting is simplified in another preferred embodiment in that the at least one stop for the cutting ring is segmented. In order to improve the surface of the fitting, the fitting may be coated at the end of its production in a dip bath, for example with zinc. The excess coating material then flows off the fitting surface in a further step. In the case of a continuous stop, a part of the excess coating material would accumulate in the region of the stop, so that so-called drips are formed. These may need to be removed in an additional step. This is prevented by a segmented stop, since the excess coating material can flow off through the free spaces lying between the segments of the stop.

The object of the invention is furthermore achieved by a system consisting of a pipe and a fitting, the fitting being formed as a fitting according to the invention, and the wall thickness in the contact region corresponding substantially to the wall thickness of the pipe.

The fact that the wall thickness in the contact region of the fitting is not less than the wall thickness of the pipe prevents the fitting from rusting through prematurely and thus leading to non-leaktightness of the overall system. The fact that the wall thickness in the contact region of the fitting is not greater than the wall thickness of the pipe simultaneously minimises the weight and the material costs of the fitting.

In a preferred embodiment, the fitting is provided in the compressed or uncompressed state.

The object of the invention is furthermore achieved by the use of a fitting according to the invention to connect thick-walled pipes.

The object of the invention is also achieved by a method for producing a fitting for thick-walled pipes, in which a thick-walled pipe is radially widened in a fitting region arranged at one pipe end so that the internal diameter of the fitting region corresponds substantially to the external diameter of the pipe and the wall thickness in the fitting region corresponds substantially to the wall thickness of the rest of the pipe, and in which a subregion of the fitting region, arranged at the pipe end, is radially stretched so that the internal diameter of the subregion is greater than the external diameter of the pipe, the subregion being radially stretched so that the wall thickness of the pipe in the subregion is at least in sections smaller than in the part of the fitting region which does not lie in the subregion.

Fittings according to the invention can be produced by this method. The subregion in this case corresponds to the pressing region, and the remaining part of the fitting region corresponds to the contact region. The method has the advantage that the wall thickness in the pressing region is already reduced by the stretching.

In a preferred embodiment of the method, at least one segmented stop is crimped around the end of the subregion facing towards the pipe end. In this way, a stop for a cutting element to be arranged in the subregion is produced in a straightforward way.

BRIEF DESCRIPTION OF THE DRAWINGS

Other features and advantages of the present invention will be explained in more detail in the description of an exemplary embodiment, reference being made to the appended drawing. In the drawing.

DETAILED DESCRIPTION OF THE INVENTION

Figure 1:
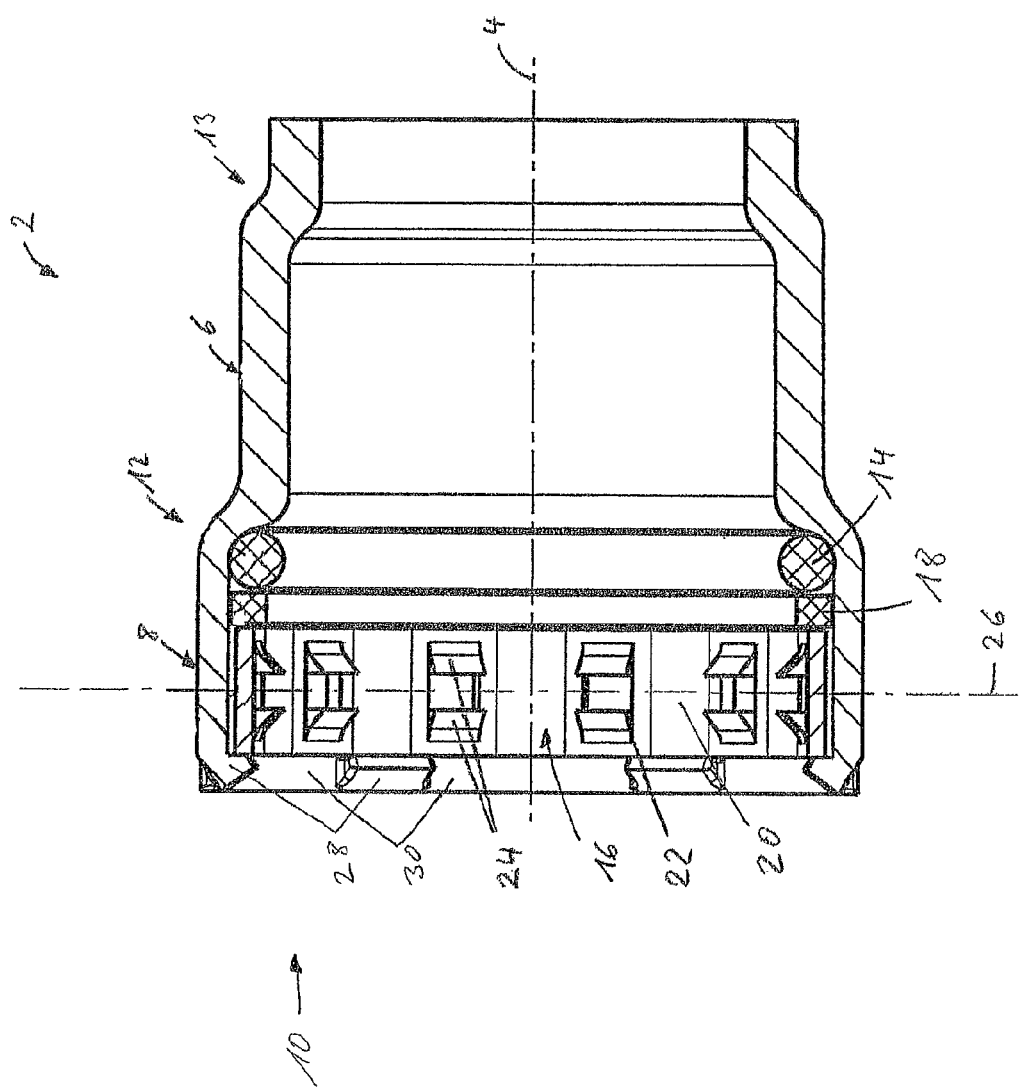
FIG. 1 shows an exemplary embodiment of a fitting according to the invention in section.

FIG. 1 shows an exemplary embodiment of a fitting 2 according to the invention in section. The fitting 2 is formed substantially with rotational symmetry with respect of the axial axis 4. It comprises a contact region 6 and a pressing region 8. The wall thickness of the fitting 2 is less in the pressing region 8 than in the contact region 6. The pressing region 8 can therefore be compressed more easily. For example, particularly elaborate pressing tools can thus be obviated.

The internal diameter of the fitting is adapted in the contact region 6 to the external diameter of a pipe to be inserted through the pipe insertion opening 10. In the transition region 12 between the contact region 6 and the pressing region 8, the internal diameter of the fitting widens so that the internal diameter of the fitting in the pressing region 8 is greater than the external diameter of the pipe to be inserted. On the opposite side of the contact region 6 from the pressing region 8, the internal diameter of the fitting tapers in a fitting transition 13 to a diameter smaller than the external diameter of the pipe to be inserted. The fitting transition 13 can be used as a stop for the pipe to be inserted.

The fitting 2 consists, for example, of a non-stainless steel.

An annular sealing element 14 having a round cross section is arranged in the transition region 12. Naturally, the cross section of the sealing element 14 may also have a different shape.

Furthermore, a cutting element 16 and an auxiliary element 18 are also arranged in the pressing region 8. The cutting element 16 consists of an annular base body 20, on which cutting members 22 are arranged, distributed over the circumference. The cutting members 22 each have two blades 24, which point towards one another in the axial direction. The cutting members 22 are mirror-symmetrical with respect to the radial plane 26 perpendicular to the axial axis 4. The annular auxiliary element 18 is used for fixing the cutting element 16 on one side.

The other side of the cutting element 16 is fixed by stops 28 arranged in the region of the pipe insertion opening 10. The stops 28 are not continuous, but segmented. Intermediate spaces 30 are therefore left between the stops. After zinc plating of the fitting by means of a dip bath, i.e. by so-called hot-dip galvanising, the excess zinc can therefore flow off between the intermediate spaces 30. In the exemplary embodiment shown, the stops 28 are produced by simple crimping of the edge of the pressing region 8 facing towards the pipe insertion opening 10.

Figure 2:
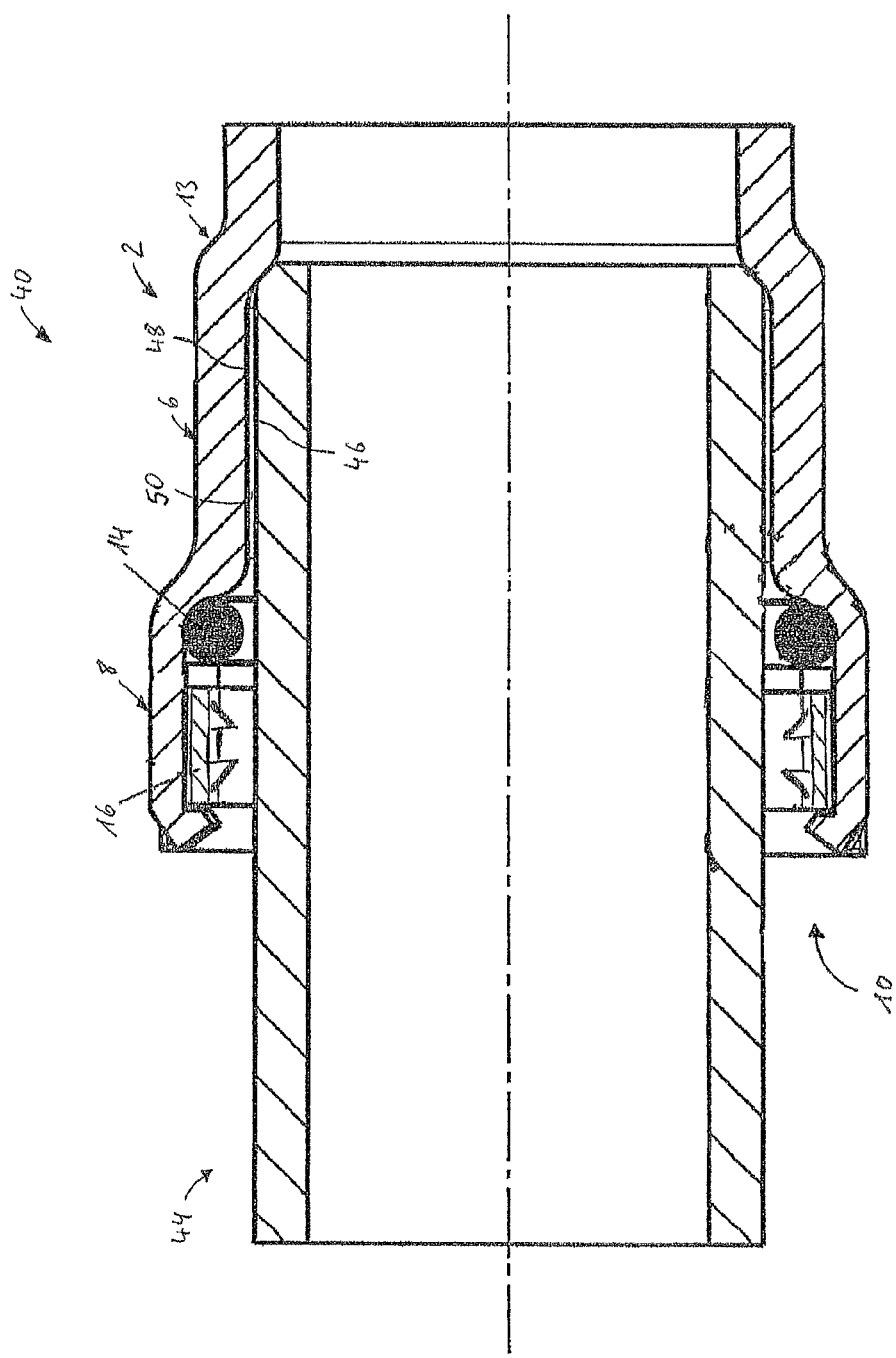
FIG. 2 shows an exemplary embodiment of a system according to the invention consisting of a fitting and a thick-walled pipe in the uncompressed state in section.

FIG. 2 shows an exemplary embodiment of a system according to the invention in the uncompressed state. The system 40 comprises the fitting 2 shown in FIG. 2 and a thick-walled pipe 44. Instead of the fitting 2, as an alternative it is naturally also possible to use a different embodiment of a fitting according to the invention. The thick-walled pipe 44 is inserted through the pipe insertion opening 10 into the fitting 2 as far as the fitting transition 13. The fitting transition 13 thus acts as a stop for the pipe 44. A gap 50 is formed between the outer wall of the pipe 46 and the inner wall 48 of the pressing region 6. The pressing region 8 is not yet compressed. The sealing element 14 and the cutting element 16 are separated from the outer wall of the pipe 46.

Figure 3:
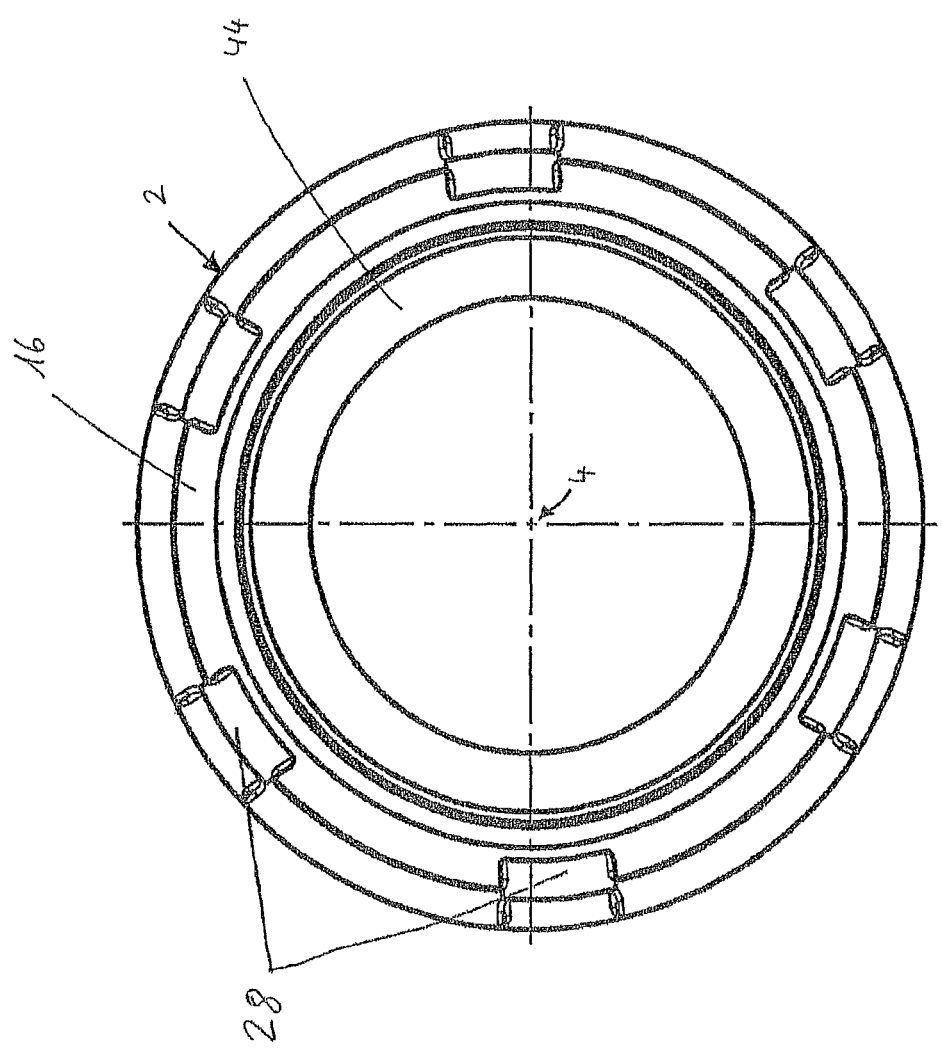
FIG. 3 shows the exemplary embodiment of FIG. 2 in plan view.

FIG. 3 shows the system of FIG. 2 in plan view. The axial axis 4 is perpendicular to the plane of the drawing. The pipe 44 is inserted centrally into the fitting 2. The cutting element 16 is separated from the outer wall of the pipe 44. It is fixed in the pressing region of the fitting 2 by the stops 28, which are segmented uniformly over the circumference of the fitting 2.

Figure 4:
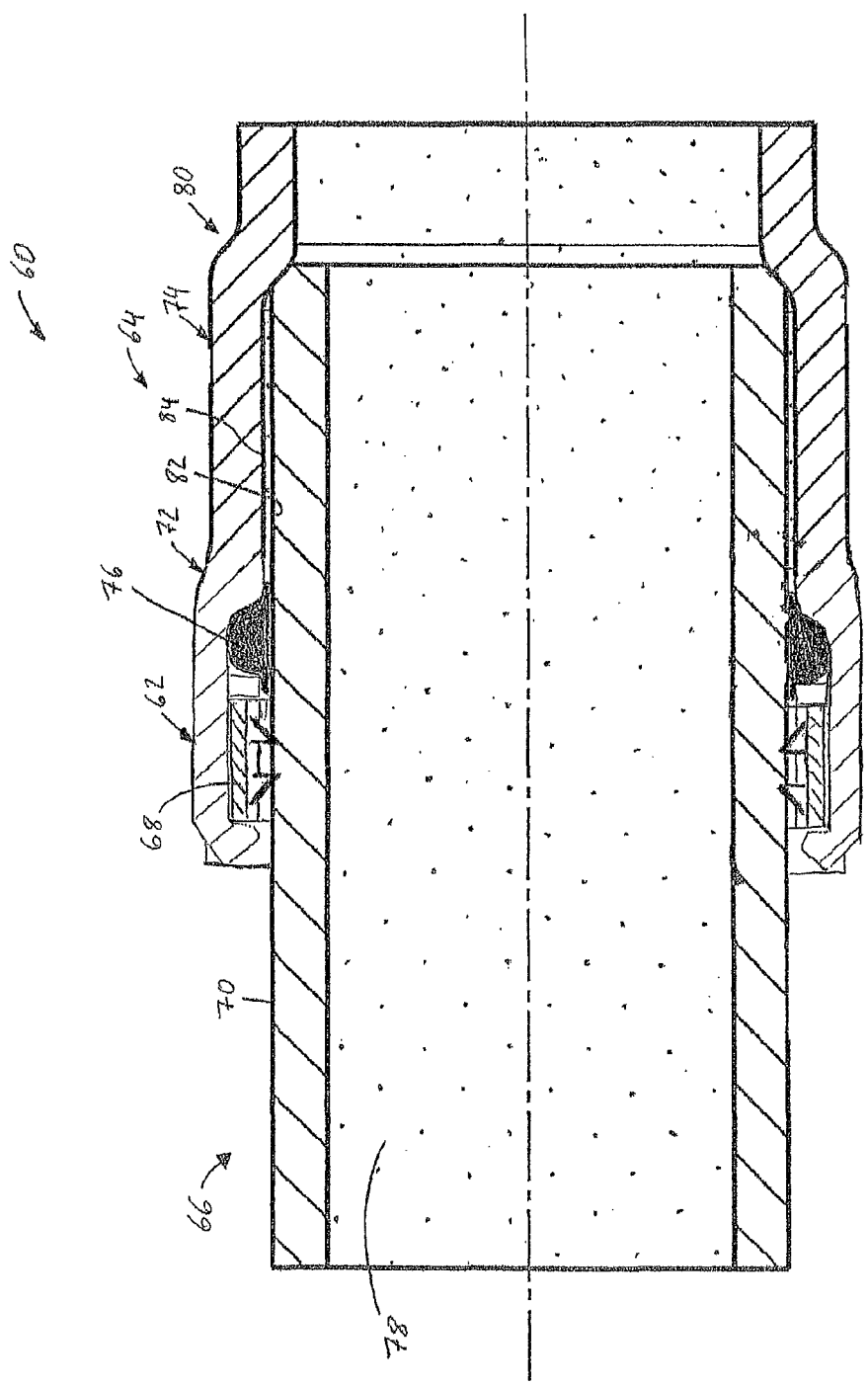
FIG. 4 shows an exemplary embodiment of a system according to the invention consisting of a fitting and a thick-walled pipe in the compressed state in section.

FIG. 4 shows an exemplary embodiment of a system according to the invention in the compressed state in section. The system 60 represented is, for example, the system 40 shown in FIG. 2 after compression of the fitting 2 in the pressing region 8. The pressing is facilitated by the wall thickness of the fitting 2 being reduced in the pressing region 8, and may for example be carried out using simple pliers.

The system 60 comprises the fitting 64 compressed in the pressing region 62 and the pipe 66. The cutting element 68 arranged on the inside of the fitting 64 in the pressing region 62 is in direct contact with the pipe 66, with the blades of the cutting members arranged on the cutting element 68 cutting into the outer wall 70 of the pipe 66. The pipe 66 is thereby fixed firmly in the fitting 64.

The annular sealing element 76 arranged in the transition region 72 between the pressing region 62 and the contact region 74 is deformed by the compression of the fitting 64, and bears firmly both on the inside of the fitting 64 in the transition region 72 and on the outer wall 70 of the pipe 66. There is therefore a leaktight connection between the fitting 60 and the pipe 66 in the transition region.

A medium 78 is conveyed in the system 60. It may, for example, be water. The bearing of the pipe 66 on the inner wall of the fitting 64 in the region of the fitting transition 80 does not represent a leaktight connection, so that the medium 80 can enter the gap 82 between the outer wall 70 of the pipe and the inner wall 84 of the fitting in the contact region 74. The inner wall 84 of the contact region 74 is therefore subject to corrosion by the medium 78. The fact that the wall thickness in this region is large, preferably the same size as the wall thickness of the pipe 66, ensures that the fitting does not rust through prematurely. The sealing element 76 prevents the medium 78 from reaching the pressing region 62. The inner wall of the fitting 64 in the pressing region 62 is therefore not subject to corrosion by the medium 78. Premature rusting through of the fitting of the thin wall in the pressing region 62 is thus prevented.

Figure 5:
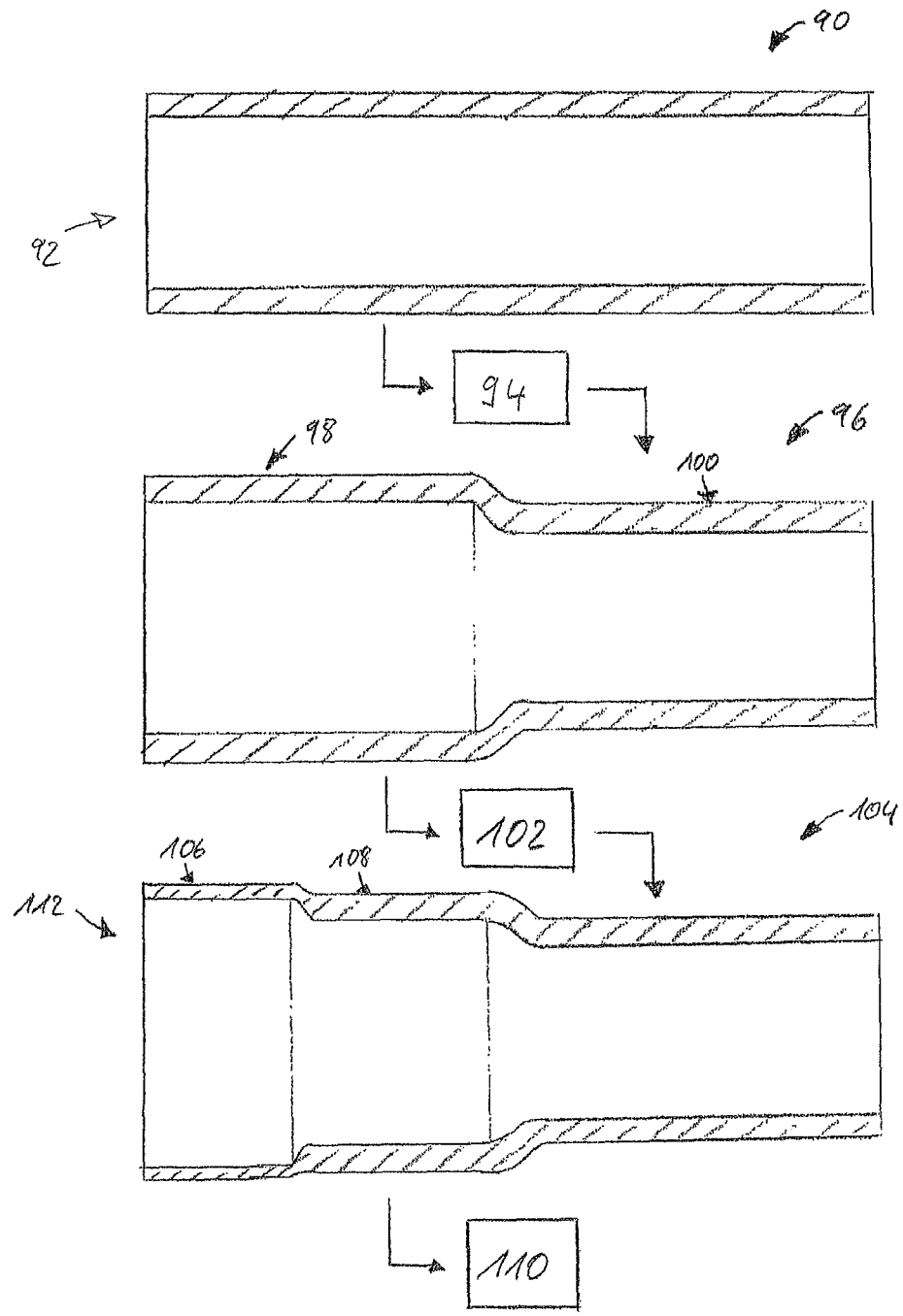
FIG. 5 shows an exemplary embodiment of a method according to the invention for producing a fitting for thick-walled pipes.

FIG. 5 shows an exemplary embodiment of the method according to the invention for producing a fitting for thick-walled pipes. A thick-walled pipe 90 is radially widened in the region of the pipe end 92 in a first method step 94, so that an intermediate product 96 is formed. The intermediate product 96 has an internal diameter in the widened fitting region 98 which corresponds substantially to the external diameter of the non-widened region 100.

In a second method step 102, a subregion of the fitting region 98 is radially stretched so that a fitting 104 is formed. The stretched subregion 106 of the fitting 104 has a greater internal diameter than the unstretched region 108 of the corresponding fitting region 98. Owing to the stretching in the second method step, the wall thickness in the subregion 106 is less than in the unstretched region 108. The fitting 104 may optionally be processed further in other method steps 110. For example, the fitting 104 may be crimped around in the region of the pipe insertion opening 112, so that segmented stops are obtained. The fitting 104 may also be coated, i.e. for example hot-dip galvanised. An example of a fitting produced in this way is shown in FIG. 1.

The invention claimed is:

1. A fitting for thick-walled pipes having a contact region, a pressing region, a wall, and a pipe insertion opening, the pressing region being arranged on a side of the contact region facing towards the pipe insertion opening and the wall substantially consisting of a steel, which is not stainless, wherein the wall has a wall thickness in the pressing region that is at least in sections less than the wall thickness in the contact region, wherein the pressing region has at least one stop for the cutting element on a side facing away from the contact region, and wherein the at least one stop for the cutting element is segmented.

2. The fitting according to claim 1, wherein a sealing element is provided in a transition region between the pressing region and the contact region.

3. The fitting according to claim 1, wherein the cutting element is provided in the pressing region.

4. The fitting according to claim 1, wherein the cutting element comprises an annular base body with cutting members arranged on the base body along its circumference, each cutting member having at least one inwardly pointing blade and each cutting member being mirror-symmetrical with respect to a radial plane of the annular base body.

5. The fitting according to claim 4, wherein all the cutting members are mirror-symmetrical with respect to a single radial plane of the annular base body.

6. The fitting according to claim 4, wherein the cutting members each comprise two blades spaced apart in the axial direction.

7. The fitting according to claim 6, wherein the respective two blades of a cutting member are directed obliquely towards one another or obliquely away from one another.

8. A system consisting of a pipe and a fitting, the fitting being formed according to claim 1, wherein the wall thickness in the contact region corresponds substantially to the wall thickness of the pipe.

9. The system according to claim 8, wherein the fitting is provided in the compressed or uncompressed state.

* * * * *